UNITED STATES PATENT OFFICE.

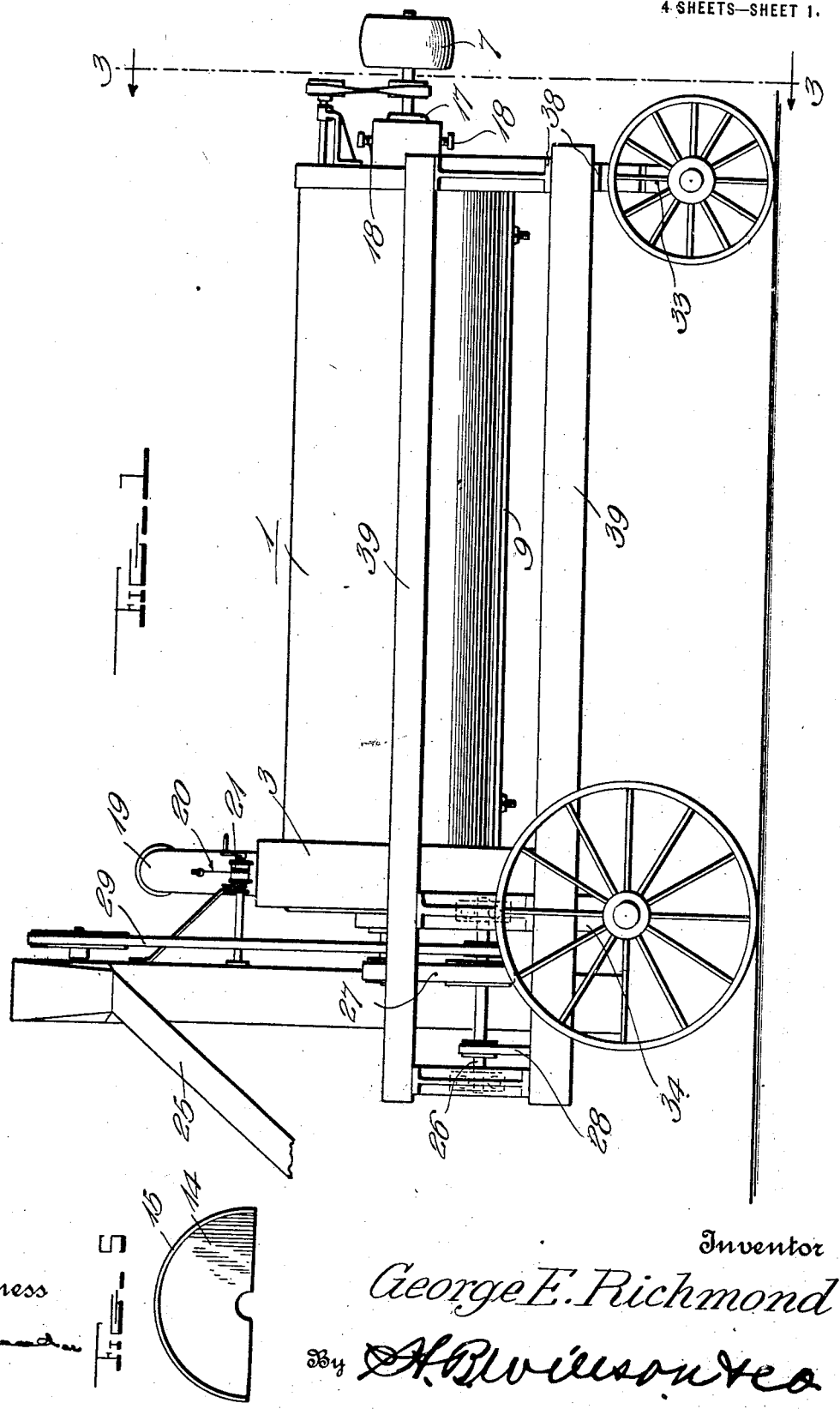

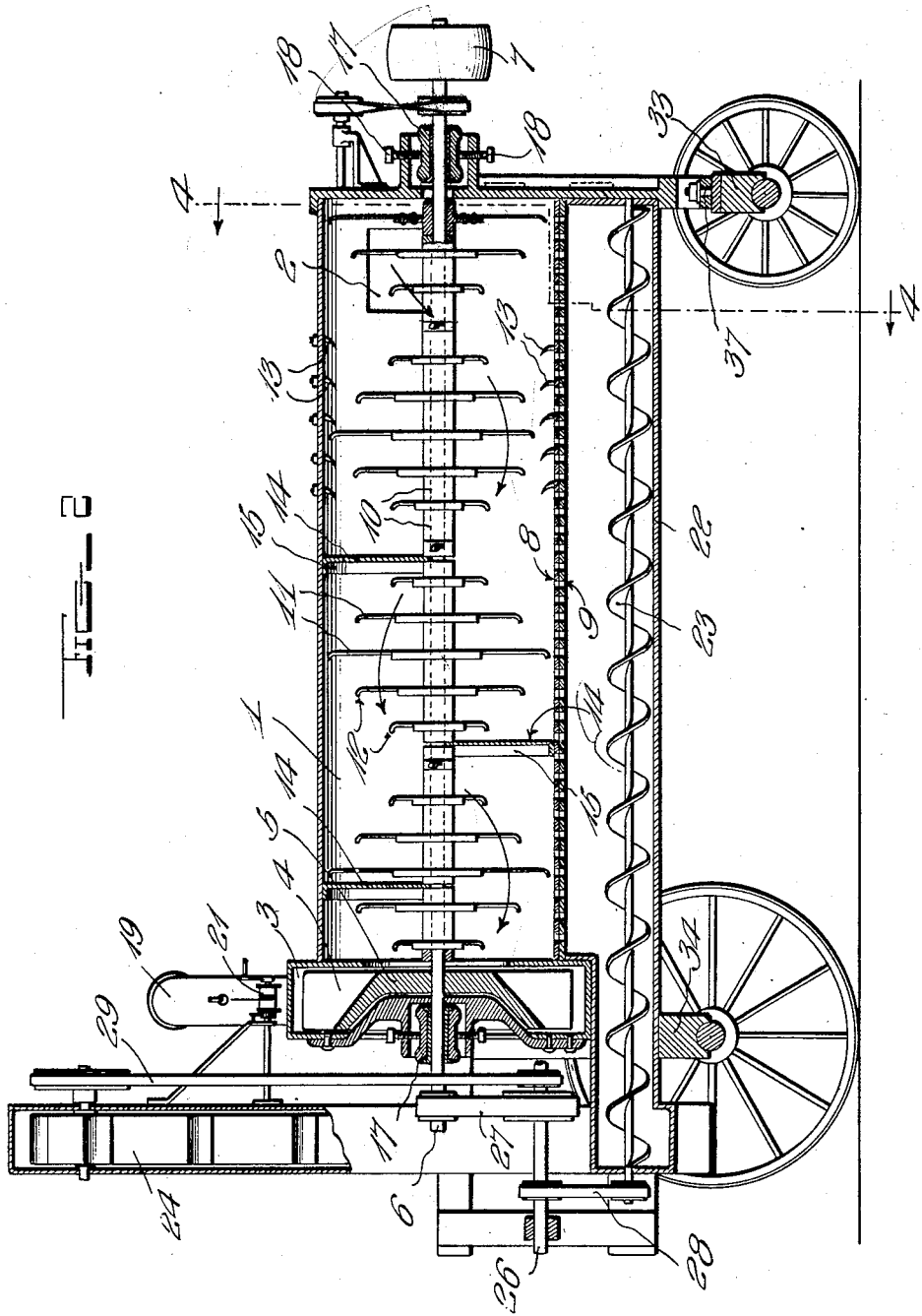

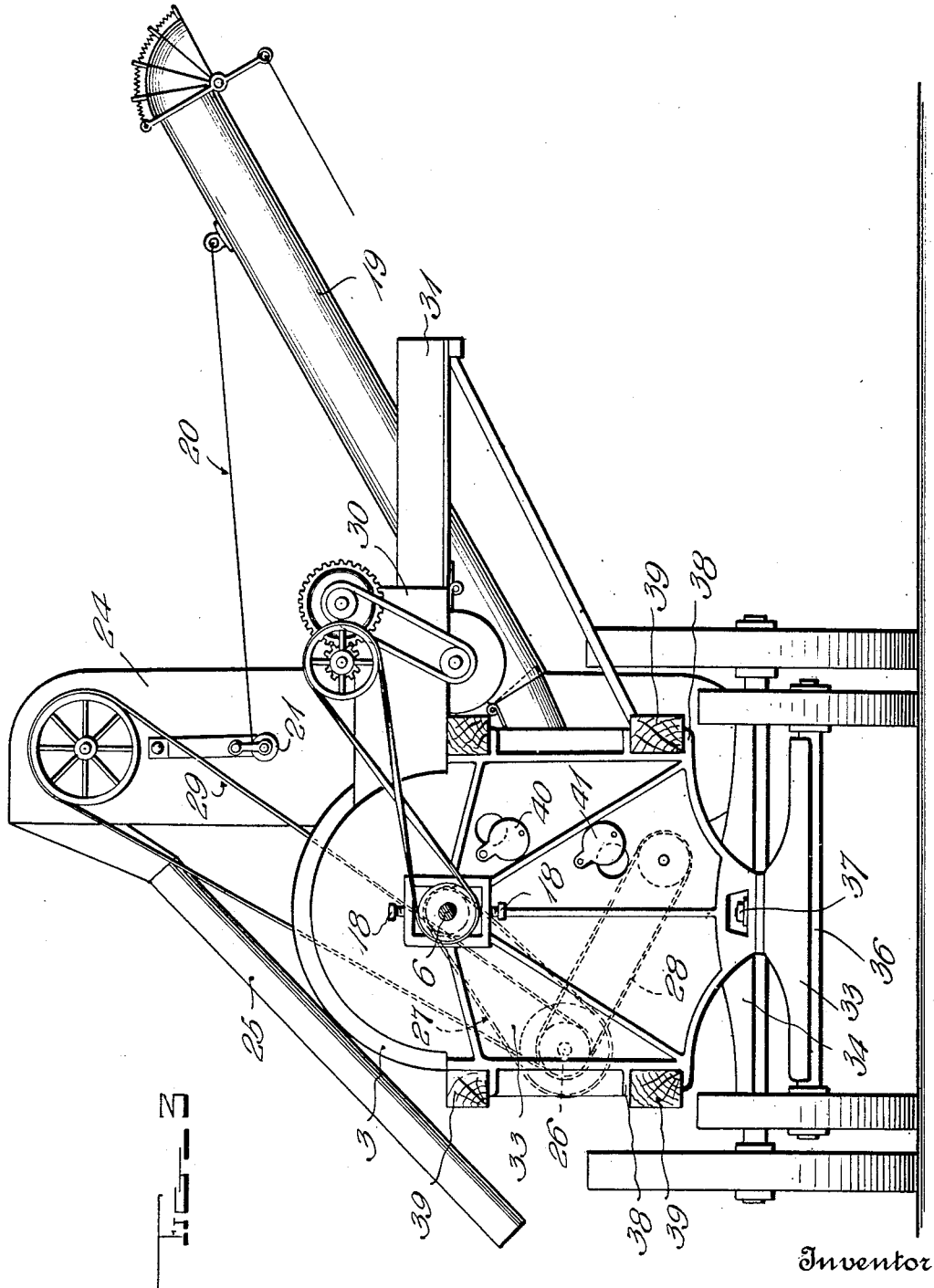

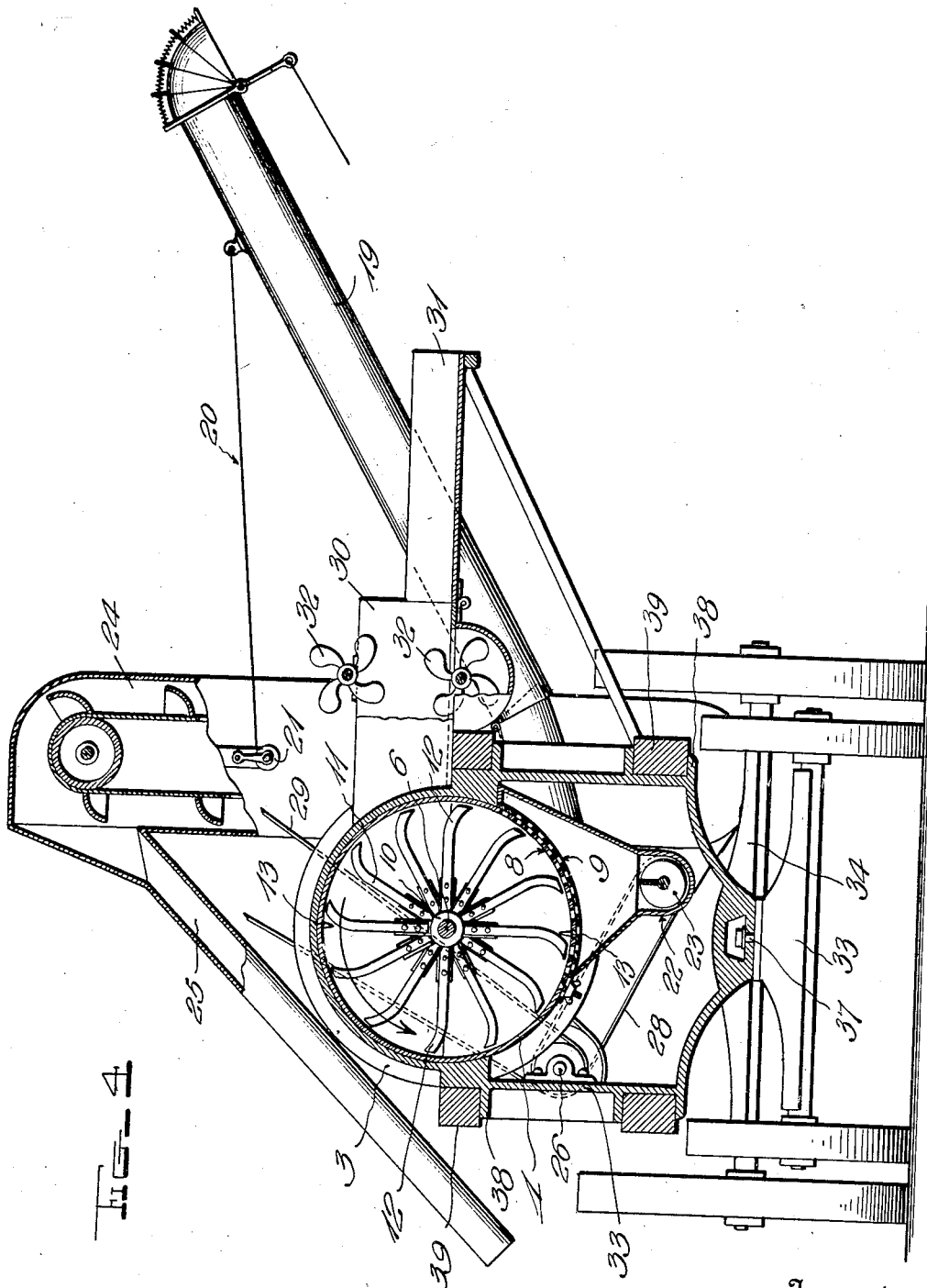

GEORGE E. RICHMOND, OF ENID, OKLAHOMA, ASSIGNOR TO DAVIS MANUFACTURING COMPANY, OF ENID, OKLAHOMA.

THRESHING-MACHINE.

1,287,439.  Specification of Letters Patent.  Patented Dec. 10, 1918.

Application filed November 22, 1917. Serial No. 203,406.

*To all whom it may concern:*

Be it known that I, GEORGE E. RICHMOND, a citizen of the United States, residing at Enid, in the county of Garfield and State of Oklahoma, have invented certain new and useful Improvements in Threshing-Machines; and I do declare the following to be a full, clear, and exact description of the invention, such as will enable others skilled in the art to which it appertains to make and use the same.

My invention has for its object to improve upon the construction of threshing machines of the type employing a rotary beater within a threshing chamber through which a draft of air is created, to such an extent as to provide for perfect separation of the grain from the straw and chaff.

Another object is to provide a machine which will readily meet the numerous requirements for threshing numerous kinds of cereal grains, Kafir-corn, alfalfa, millo-maize, peas, beans, etc.

With the foregoing general objects in view, the invention resides in the novel features of construction and unique combinations of parts to be hereinafter fully described and claimed, the descriptive matter being supplemented by the accompanying drawings which form a part of this specification and in which:—

Figure 1 is a side elevation of the improved machine;

Fig. 2 is substantially a longitudinal section thereof;

Fig. 3 is a vertical transverse section on the plane of the line 3—3 of Fig. 1;

Fig. 4 is a second transverse section on the planes indicated by the lines 4—4 of Fig. 2; and Fig. 5 is a side elevation of one of the baffle plates to be described.

In the drawings above briefly described, the numeral 1 designates a horizontally disposed cylindrical threshing chamber having at one end an inlet 2 for the material to be threshed, whereas the other end of said chamber communicates with a fan housing 3 in which a fan 4 is rotatably mounted, the blades of said fan being preferably cast in a hub 5 which is of sufficient weight and size to serve as a balance wheel for the shaft 6 upon which it is mounted, said shaft extending longitudinally through the center of the chamber 1. The shaft 6 is preferably provided on one end with a pulley 7 for rotating it at a suitable speed so that the fan 4 will create a draft of air through the threshing chamber 1 to feed the unthreshed material into the machine, and to expel the straw and chaff therefrom, this straw and chaff being taken into the housing 3, whereas the separated grain or the like will be discharged from the chamber 1 through the outlet grating 8 which extends throughout the full length of said chamber, near the lower side thereof. An auxiliary grating 9 contacts slidably with the lower side of the grating 8, so that by adjusting the two relatively by any preferred means, the size of the discharge openings may be varied.

The shaft 6 serves not only to drive the fan 4, but said shaft carries a plurality of hubs 10 upon which radially disposed threshing or beater arms 11 are mounted, the outer ends of said arms being preferably curved rearwardly as indicated at 12 so that they will not become entangled with the material being threshed. These arms also, in most cases, will curve toward the outlet end of the threshing chamber 1. Near the inlet end of said chamber, a plurality of teeth 13 extend inwardly from the side wall thereof for coöperation with the arms 11 in effectively splitting the beards of the grain as the current of air through the threshing chamber continues to move the material toward the outlet end thereof. It has been found that much better results are obtained if the air currents and the material carried therein, are caused to take a zig-zag course, and in order to produce this result, I provide a series of transverse baffle plates 14 between the teeth 13 and the delivery end of the chamber 1, said baffle plates being alternately disposed below and above the shaft 6. The outer edges of the several plates 14 are provided with lateral flanges 15 secured to the wall of the chamber 1, whereas the inner edges of said plates are received between certain of the hubs 10 and are formed with notches 16 which loosely receive the shaft 6. By this arrangement, the air currents are caused to travel substantially on the course indicated by the arrows in Fig. 2 and it has been found that thorough separation of the grain from the straw is obtained from the structure which causes this direction of travel. It will be observed that the lower baffle or baffles 14 span the outlet grating 8 and thus any grain which might otherwise be fed along said grating toward the outlet end of the machine, will be checked, so that the discharge of grain throughout the length of the threshing chamber is substantially uniform.

Under certain conditions, it is highly desirable to shift the beater arms so that they operate in extremely close proximity to the outlet grating 8, whereas other conditions will require that the space between the two shall not be so small; and in order to meet these requirements, the opposite ends of the shaft 6 are mounted in bearings 17 which are adjustable vertically by means of set screws 18 or other preferred means. Both bearings 17 are preferably of the roller type, but it will be obvious that others could also be employed.

The straw and chaff are discharged from the fan housing 3 through a suitable stacker 19 which may be adjusted vertically by means of the cable 20 and drum 21, and the threshed material is discharged from the threshing chamber into a trough 22 below the outlet grating 8. A worm conveyer 23 is located in the trough 22 for discharging the grain into a vertical elevator 24 whose outlet 25 may deliver to any preferred type of grain cleaner, or may discharge directly into sacks or other appropriate receptacles. Also, the outlet 25 may be located at such a height as to permit it to discharge directly into the bed of a wagon.

For the purpose of driving the conveyer 23 and the elevator 24, a counter shaft 26 is preferably located at one side of the machine, said counter shaft being driven by a belt 27 from the main shaft 6. Belts 28 and 29 extend from the counter shaft 26 to the conveyer 23 and the elevator 29, respectively, and serve to drive these parts at the appropriate speed.

Any preferred type of feeder may be employed in connection with the features above described. I prefer however to project an inlet chute 30 outwardly from the inlet opening 2 and to provide a suitable feeding table 31 at the outer end of this chute, upon which the bundles of grain are positioned. From this table, the material is forced into the chute 30 and is here acted upon by a pair of combined band cutters and feeders 32. The uppermost of these feeders is preferably driven at a greater rate of speed than the lower one, in order that the bundles will be thoroughly disintegrated before entering the threshing chamber 1.

The entire machine is mounted upon a suitable truck which includes front and rear castings 33 and 34, the front casting forming the front end of the chamber 1, whereas the rear side of the fan housing 3 is rigidly secured to and supported by the other casting. The rear casting 34 may well be secured directly to the rear axle 35, whereas the front axle 36 will be pivoted at 37 to the front casting 33 to permit the necessary guiding of the machine. Both of the castings 33 and 34 are provided with suitable seats 38 in which the ends of longitudinal beams 39 are bolted or otherwise secured, so that an extremely rigid and durable frame structure is provided for supporting the several parts of the machine.

In operation, the material to be threshed is fed into the threshing chamber 1 by way of the inlet chute 30, the bands being cut in said chute by the rotary feeders 32. These blades also disintegrate the bundles of grain thoroughly before they are fed into the threshing chamber. As soon as the material enters the chamber 1, the strong longitudinal draft of air therethrough, starts moving said material toward the fan housing 3, but at the same time the rotary beater arms 11 and the teeth 13, coöperate in initially separating the grain from the straw and chaff. As the material follows the course outlined by the arrows in Fig. 1 and is at the same time whirled violently around by the rotary beater arms, all grain is thoroughly separated from the straw and the like and will fall by gravity through the outlet grating 8 and into the trough 22. From this trough, the worm conveyer 23 carries the threshed material to the elevator 24 and the latter may either convey the grain to a final cleaning device, or to a wagon or other appropriate receptacle. The straw and chaff are drawn into the fan housing 3 by the fan 4 and are thrown from the housing through the stacker 19 which may be raised gradually as the height of the stack increases. Whenever occasion so demands, the beater arms 11 may be adjusted toward or away from the outlet grating 8, by suitable adjustment of the set screws or the like 18 which control the positions of the bearings 17. Also, whenever required, an auxiliary quantity of air may be admitted into the threshing chamber 1 and the trough 22, by means of appropriate valves 40 and 41, respectively, which are carried by the end casting 33.

From the foregoing, taken in connection with the accompanying drawings, it will be obvious that although my invention is of comparatively simple and inexpensive nature, it will be highly efficient and durable for performing all sorts of threshing and separating operations. Particular emphasis is laid upon the provision of the baffle plates 14 and their staggered relation, upon the provision of the teeth 13 in the particular relation set forth, and upon the adjustability of the rotary beater toward and away from the outlet. The other features described are more or less important, but I wish it understood that these features, as well as those just enumerated, may well be varied without sacrificing the principal advantages of the machine.

I claim:

1. In a threshing machine, the combination of a threshing chamber, a rotary beater passing longitudinally through said chamber, means for creating a draft of air longitudinally through said chamber and substantially semi-disk shaped baffle plates extending transversely across said chamber and disposed alternately on opposite sides of said shaft, to provide a zig zag course for the material being threshed.

2. In a threshing machine, the combination of a horizontal elongated threshing chamber having in its lower side a longitudinally extending threshed grain outlet, a rotary beater extending longitudinally through said chamber, and a vertical baffle plate across said chamber and extending from the lower side thereof substantially to the axis of the beater, said baffle spanning said grain outlet, and means for creating a draft of air longitudinally through said chamber.

3. A structure as specified in claim 3 and additional vertical baffles across the upper portion of said chamber and positioned in staggered relation to said first named baffle.

4. In a threshing machine, the combination of an elongated threshing chamber having an inlet in one end and an outlet at its other, a driven shaft extending longitudinally through said chamber and having lateral beater arms, teeth extending inwardly from the wall of said chamber near the inlet end thereof, longitudinally spaced transverse baffles in said chamber between said teeth and the outlet end of the chamber, said baffles being alternately disposed on opposite sides of said shaft, and means for creating a current of air longitudinally through said chamber.

5. In a threshing machine, the combination of a threshing chamber and means for creating suction longitudinally therethrough, a rotary shaft passing longitudinally through said chamber, hubs mounted on said shaft in abutting relation and carrying beater arms and a transverse baffle plate secured to the wall of said chamber and having its inner edge positioned between two of said hubs.

6. A threshing machine comprising a horizontal threshing cylinder having an unthreshed grain inlet at one end, a straw outlet at its other end, and a longitudinal threshed grain outlet in its lower side, means for creating a draft of air through said cylinder from its inlet to its outlet end, a central driven shaft extending longitudinally through said cylinder and having radiating beater arms, and a plurality of longitudinally spaced transverse partitions in said cylinder disposed alternately above and below said shaft, said partitions being of semi-disk shape with their arcuate edges secured to the cylinder wall and their straight edges extending horizontally across said cylinder adjacent said shaft.

In testimony whereof I have hereunto set my hand in the presence of two subscribing witnesses.

GEORGE E. RICHMOND.

Witnesses:
GEO. D. WILSON,
E. CORNITIUS, Jr.